(12) United States Patent
Alalusi et al.

(10) Patent No.: US 11,237,250 B1
(45) Date of Patent: Feb. 1, 2022

(54) TECHNIQUES FOR GENERATION OF HIGH BRIGHTNESS BEAMS

(71) Applicant: AEVA, INC., Mountain View, CA (US)

(72) Inventors: Mazin Alalusi, Sunnyvale, CA (US); Pradeep Srinivasan, Fremont, CA (US); Kevin Masuda, Alhambra, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/188,072

(22) Filed: Mar. 1, 2021

(51) Int. Cl.
    *G01S 7/481* (2006.01)
    *G01S 17/32* (2020.01)
    *G02B 6/42* (2006.01)

(52) U.S. Cl.
    CPC .......... *G01S 7/4814* (2013.01); *G01S 7/4817* (2013.01); *G01S 17/32* (2013.01); *G02B 6/4202* (2013.01)

(58) Field of Classification Search
    CPC ...... G01S 7/4814; G01S 7/4817; G01S 17/32; G02B 6/4202
    See application file for complete search history.

(56) References Cited

U.S. PATENT DOCUMENTS

| 10,948,600 B1* | 3/2021 | Barber | ............... G01S 17/34 |
| 2018/0136539 A1* | 5/2018 | Kim | ............... G01S 17/06 |

OTHER PUBLICATIONS

Sanghadasa, Mohan, et al. "A simplified technique for efficient fiber-polymer-waveguide power coupling using a customized cladding with tunable index of refraction." Journal of lightwave technology 24.10 (2006): 3816-3823. (Year: 2006).*

* cited by examiner

*Primary Examiner* — Luke D Ratcliffe
(74) *Attorney, Agent, or Firm* — Womble Bond Dickinson (US) LLP

(57) ABSTRACT

A light detection and ranging apparatus (LIDAR) includes an optical source to generate an optical beam and one or more waveguides to steer the optical beam. The one or more waveguides include a first cladding layer having a first refractive index and a second cladding layer disposed below the first cladding layer, the second cladding layer having second refractive indexes including a range of different refractive indexes, wherein the range of different refractive indexes is greater than the first refractive index of the first cladding layer.

16 Claims, 6 Drawing Sheets

TECHNIQUES FOR GENERATION OF HIGH BRIGHTNESS BEAMS

TECHNICAL FIELD

The present disclosure relates generally to light detection and ranging (LIDAR) that provides simultaneous measurement of range and velocity across two dimensions.

BACKGROUND

Fast-scanning mirrors are the primary components used to illuminate a scene in most conventional LIDAR systems. One mirror typically scans quickly along the X direction (azimuth), while another mirror scans slowly along the Y direction (elevation). Light emission and detection from target reflections are done coaxially, typically via a single-mode fiber. A 3D point cloud can be established when point-wise detected range information is combined with angular position feedback from the scanning mirrors.

To achieve higher frame rates, the mirror's angular velocity is increased, especially that of the scanner in faster scan direction, such as along the X direction. When using mirrors with a high angular velocity and single-mode fiber-based detection, a target signal from distant objects can be severely degraded. Signal degradation is often due to the difference in angular position of the scanner mirror from the launch time of the optical signal (pulsed or frequency swept) to the collection time of the same signal from a distant scattering target. This slight angular change causes a walk-off of the target signal at the fiber tip decreasing the coupling efficiency, which manifests itself as a weaker signal detection. Such degradation becomes more severe as the fiber diameter decreases or as the mirrors' angular velocity increases.

SUMMARY

Example implementations of the present disclosure are directed to an improved scanning LIDAR system. Example implementations of the present disclosure are based on a type of LIDAR that uses frequency modulation (FM) and coherent detection to overcome the shortcomings of traditional LIDAR systems and the limitations of prior FM LIDAR systems. Historically, FM LIDAR systems suffer from significant losses in the beam's return path; thus, such systems, which are often quite bulky, require a higher average beam output power to measure distances comparable to time-of-flight (TOF) LIDAR systems. However, the range is limited by the operating distance for eye-safe output powers.

Example implementations of the present disclosure are configured to simultaneously measure range and velocity, using coherent detection, and have the added benefit of immunity to crosstalk from other LIDAR systems. Other implementations may be used with incoherent systems to improve, range, frame rate, or detection. Example implementations minimize optical losses in the beam's return path, thereby increasing the system's measurement range. Additionally, by using nondegenerate optical sources, example implementations can leverage mature wavelength division multiplexing (WDM) techniques often used in integrated silicon photonics, a desired platform due to its compactness and relative stability in varying environmental conditions.

A conventional frequency-modulated continuous-wave (FMCW) LIDAR system relies on scanning an optical beam, such as a laser beam, or multiple optical beams over a desired field of view (FOV) to map target space in three dimensions (3D) and in time. To guide the optical beam, a conventional LIDAR system may utilize one or more waveguides. Each conventional waveguide may include a first cladding layer (also referred to as a "p-cladding layer" hereafter) and a second cladding layer (also referred to as an "n-cladding layer" hereafter) that have relatively similar thicknesses and constant refractive indexes. While a conventional waveguide may be suitable for guiding the optical beam, the design of the conventional waveguide may be improved to increase the performance of the conventional FMCW LIDAR system.

A conventional quantum well or multi-quantum well (MQW) may use an optical source to generate light. The MQW and a separate confinement heterostructure (SCH) may form a waveguide, where P-doped and N-doped layers may form the cladding layers of the waveguide. The SCH may be formed of a material having a step or graded refractive index. The waveguide, however, does not include an n-cladding layer that has a range of different refractive indexes.

Example implementations of the present disclosure provide for an improved, graded refractive index waveguide (also referred to as "waveguide" hereafter). The waveguide may include a first cladding layer (e.g., p-cladding layer) and a second cladding layer (e.g., n-cladding layer), as previously described. The second cladding layer of the waveguide, however, may be composed of a material having a range of refractive indexes that are higher than the first cladding layer. For example, the second cladding layer may have a refractive index gradient that increases from a first surface of the second cladding layer to a second surface of the second cladding layer. Furthermore, the thickness of the second cladding layer may be greater than the thickness of the first cladding layer.

Use of the waveguide may provide for an improved LIDAR system. The range of refractive indexes of the n-cladding layer may pull and expand the optical mode of the optical beam into the n-cladding layer from the p-cladding layer. This may result in an increase in the saturation power of the optical beam because the optical confinement factor and differential gain are significantly reduced. This may also result in improved coupling efficiency by expanding the beam profile vertically to match another waveguide of the LIDAR system, improved efficiency of the optical beam, and reduce amplitude and phase noises experienced by the optical beam, all of which improve the performance of the LIDAR system.

The present disclosure includes, without limitation, the following example implementations.

Some example implementations provide a light detection and ranging (LIDAR) system including an optical source to generate an optical beam and one or more waveguides, coupled to the optical source, to steer the optical beam. The one or more waveguides include a first cladding layer having a first refractive index and a second cladding layer disposed below the first cladding layer and above a substrate. The second cladding layer includes second refractive indexes that steer the optical beam towards the substrate. The second refractive indexes include a range of different refractive indexes, wherein the range of different refractive indexes is greater than the first refractive index of the first cladding layer.

Some example implementations provide a method including receiving, by a waveguide, an optical beam from an optical source of a light detection and ranging (LIDAR) system. The waveguide includes a first cladding layer having a first refractive index and a second cladding layer disposed below the first cladding layer. The second cladding layer includes second refractive indexes that steer the optical beam towards a substrate. The second refractive indexes include a range of different refractive indexes, wherein the range of different refractive indexes is greater than the first refractive index of the first cladding layer. The waveguide propagates the optical beam using the range of different refractive indexes of the waveguide to expand an optical mode of the optical beam.

Some example implementations provide a LIDAR system including an optical source to generate an optical beam and one or more waveguides coupled to the optical source to steer the optical beam. The one or more waveguides include a first cladding layer having a first refractive index, a second cladding layer disposed below the first cladding layer, the second cladding layer having a second refractive index, wherein the second refractive index is greater than the first refractive index, and a third cladding layer disposed below the second cladding layer, the third cladding layer having a third refractive index, wherein the third refractive index is greater than the second refractive index and the first refractive index.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
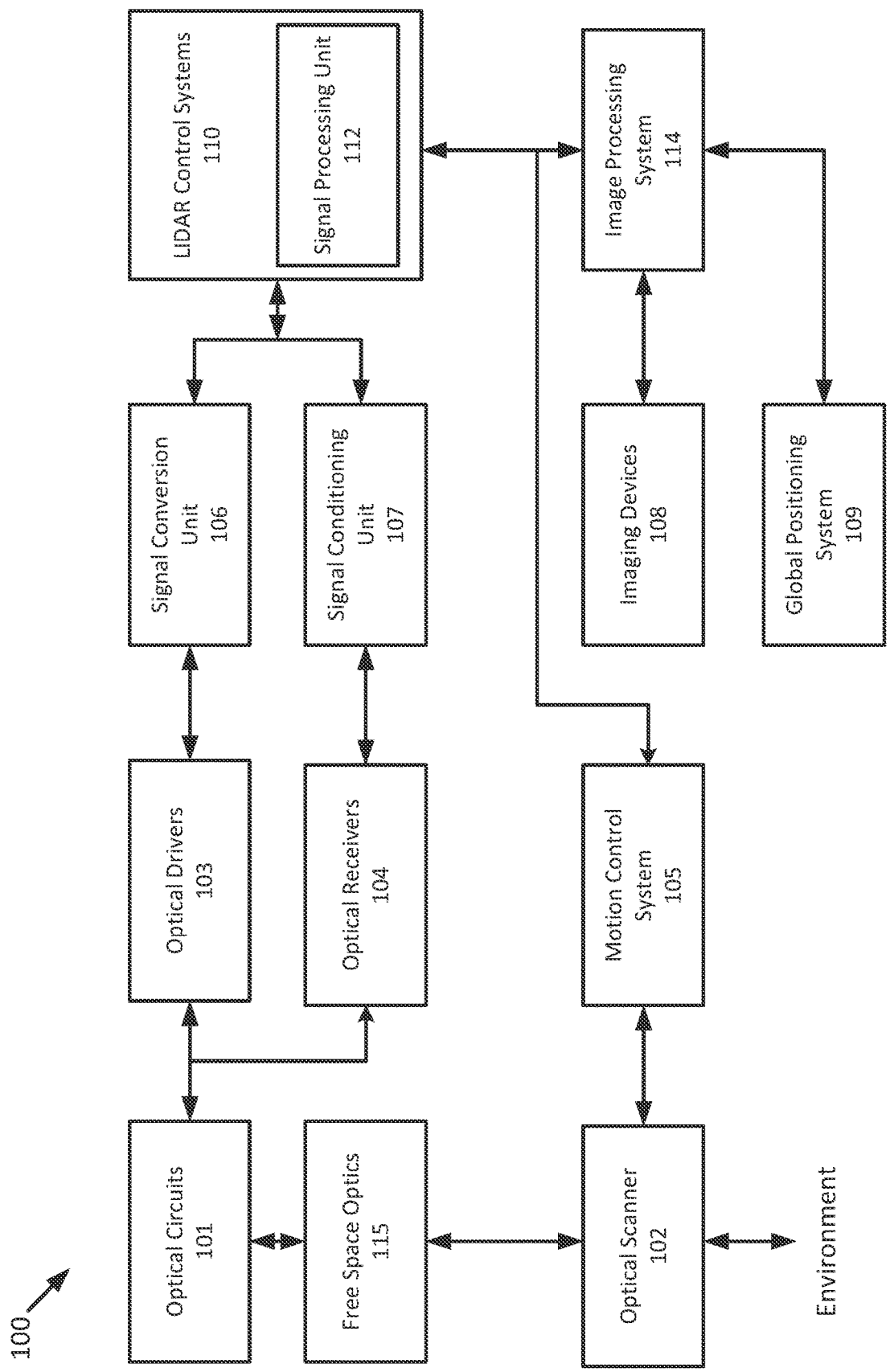
FIG. 1 illustrates a LIDAR system according to example implementations of the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produces a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data that includes information about range and/or velocity points in the target environment as the optical scanner 102 scans additional points. The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
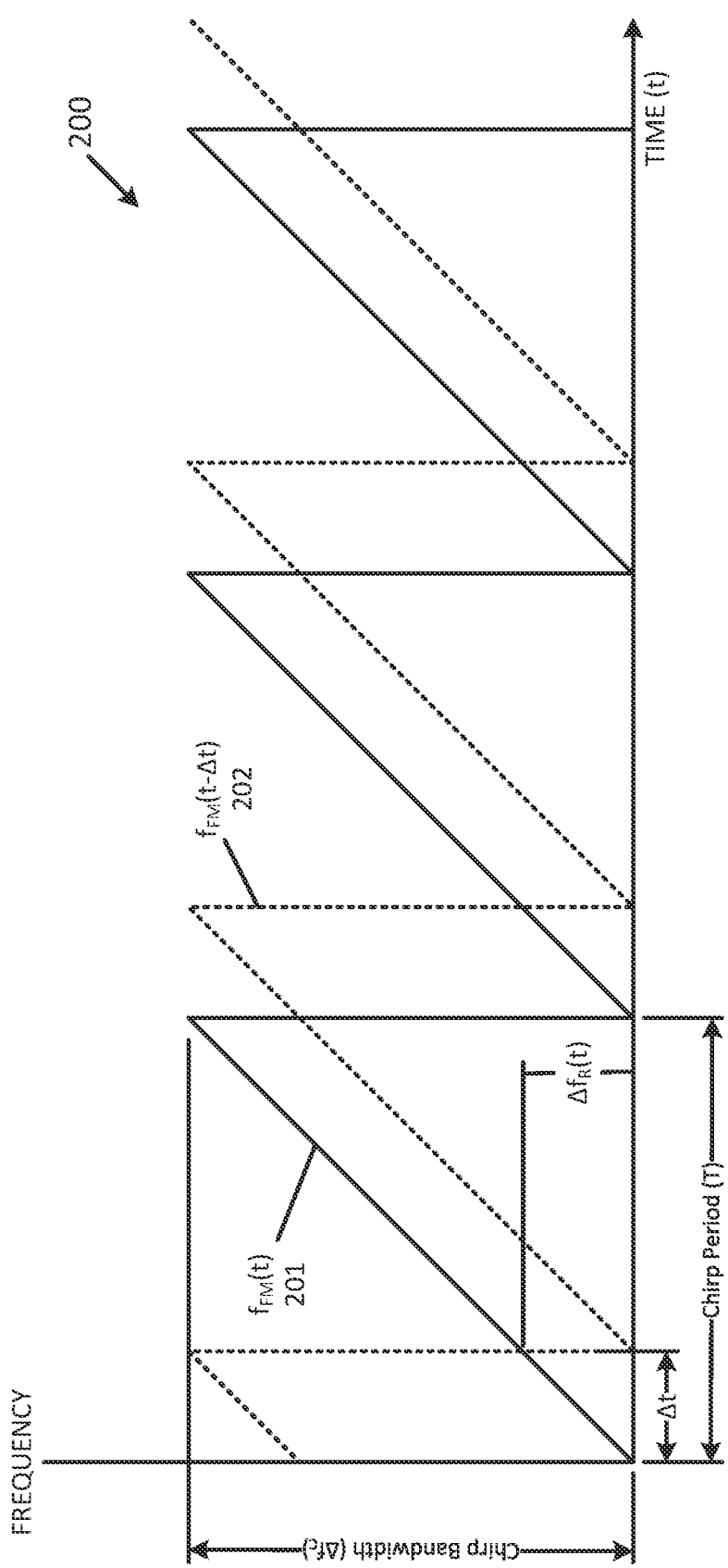
FIG. 2 is a time-frequency diagram of an FMCW scanning signal that can be used by a LIDAR system to scan a target environment according to some embodiments.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
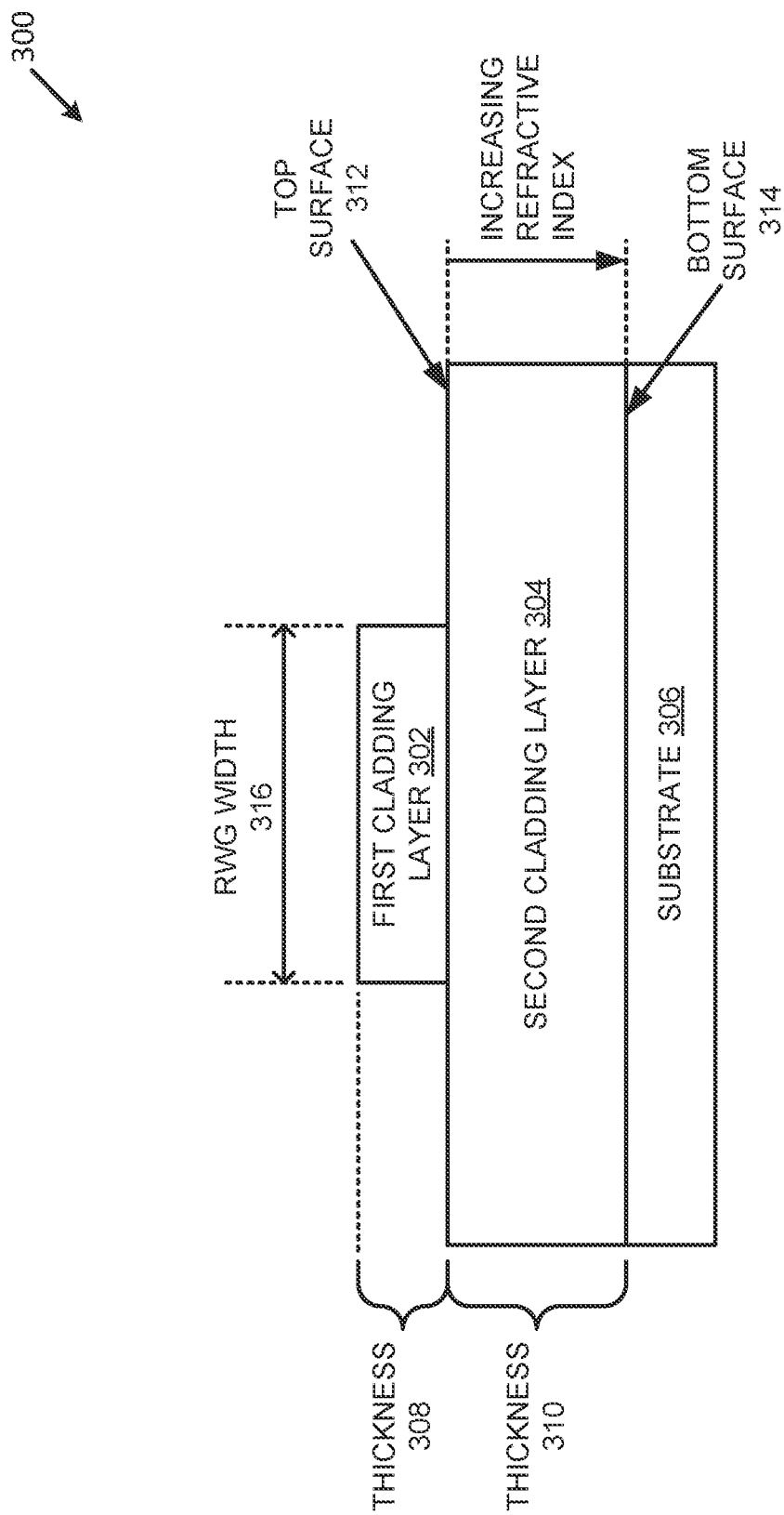
FIG. 3 depicts a waveguide having a graded index cladding layer, in accordance with embodiments of the disclosure.

FIG. 3 depicts a waveguide 300 having a graded index cladding layer, in accordance with embodiments of the disclosure. In some embodiments, waveguide 300 may be implemented in a LIDAR system, such as the LIDAR system 100 of FIG. 1. The waveguide 300 may include a first cladding layer 302 (e.g., p-cladding layer) and a second cladding layer 304 (e.g., n-cladding layer). In FIG. 3, the waveguide 300 is illustrated as being grown to a substrate 306. In some embodiments, the waveguide 300 may be a ridge-waveguide (RWG) that includes a conductive ridge protruding into the waveguide that has a width (e.g., RWG width 316).

In some embodiments, the manufacturing of waveguide 300 may include growing the layers (e.g. first cladding layer 302, second cladding layer 304, etc.) of waveguide 300 on a substrate 306. For example, the manufacturing process may begin with a raw substrate 306 and the layers of waveguide 300 may be grown sequentially, layer by layer, using a metal organic chemical vapor deposition (MOCVD) or molecular-beam epitaxy (MBE) reactor.

In embodiments, the first cladding layer 302 may be formed of a material that has a constant refractive index. A refractive index of a material may correspond to a numerical value that describes how quickly an optical signal travels through the material. In some embodiments, the first cladding layer 302 may be formed of a material that has a graded refractive index. Example materials that may be used to form the first cladding layer 302 may include, but are not limited to indium phosphide (InP) or indium gallium arsenide phosphide (InGaAsP).

The second cladding layer 304 may be disposed below the first cladding layer 302 and formed of a material that has a range of refractive indexes. In some embodiments, the second cladding layer 304 may be in direct contact with the first cladding layer 302. In other embodiments, one or more intervening layers, such as an active region and separate confinement heterostructure (SCH), may be disposed between the second cladding layer 304 and the first cladding layer 302.

In embodiments, the range of refractive indexes of the second cladding layer 304 may correspond to a graded index or gradient of refractive indexes that increases from the first surface 312 of the second cladding layer 304 to the second surface 314 of the second cladding layer 304. In an embodiment, the range of refractive indexes of the second cladding layer 304 may correspond to a graded index or gradient of refractive indexes that decreases from the first surface 312 of the second cladding layer 304 to the second surface 314 of the second cladding layer 304. In some embodiments, the range of refractive indexes may change at a linear rate. In an embodiment, the range of refractive indexes may change at an exponential rate. In some embodiments, the range of refractive indexes may change according to any other rate. Example materials that may be used to form the second cladding layer 304 may include, but are not limited to indium phosphide (InP), indium gallium arsenide phosphide (InGaAsP), indium gallium aluminum arsenide (InGaAlAs), or any combination thereof.

In waveguide 300, the range of refractive indexes of the second cladding layer 304 may be greater than the refractive index of the first cladding layer 302. For example, if the first cladding layer 302 has a refractive index value of 3.15, the second cladding layer 304 may have a range of refractive index values from 3.2-3.3. The range of refractive indexes of the second cladding layer 304 being greater than the refractive index of the first cladding layer 302 may cause the optical mode of an optical beam being transmitted through waveguide 300 to be expanded (e.g., pulled) towards the substrate 306, as will be described in additional detail at FIG. 4 below.

The first cladding layer 302 may have a thickness 308 and the second cladding layer 304 may have a thickness 310 that each correspond to the dimensional height of their respective cladding layers that form waveguide 300. In embodiments, the thickness 308 of the first cladding layer 302 may be less than the thickness 310 of the second cladding layer 304. In an embodiment, the thickness of the first cladding layer may be between 1.2 and 1.8 microns (μm). In some embodiments, the thickness 310 of the second cladding layer 304 may be between 2 and 5 μm.

It should be noted that thickness 308 of the first cladding layer 302 and thickness 310 of second cladding layer 304 are shown for illustrative purposes only and may not be to scale in accordance with embodiments of the disclosure.

Figure 4:
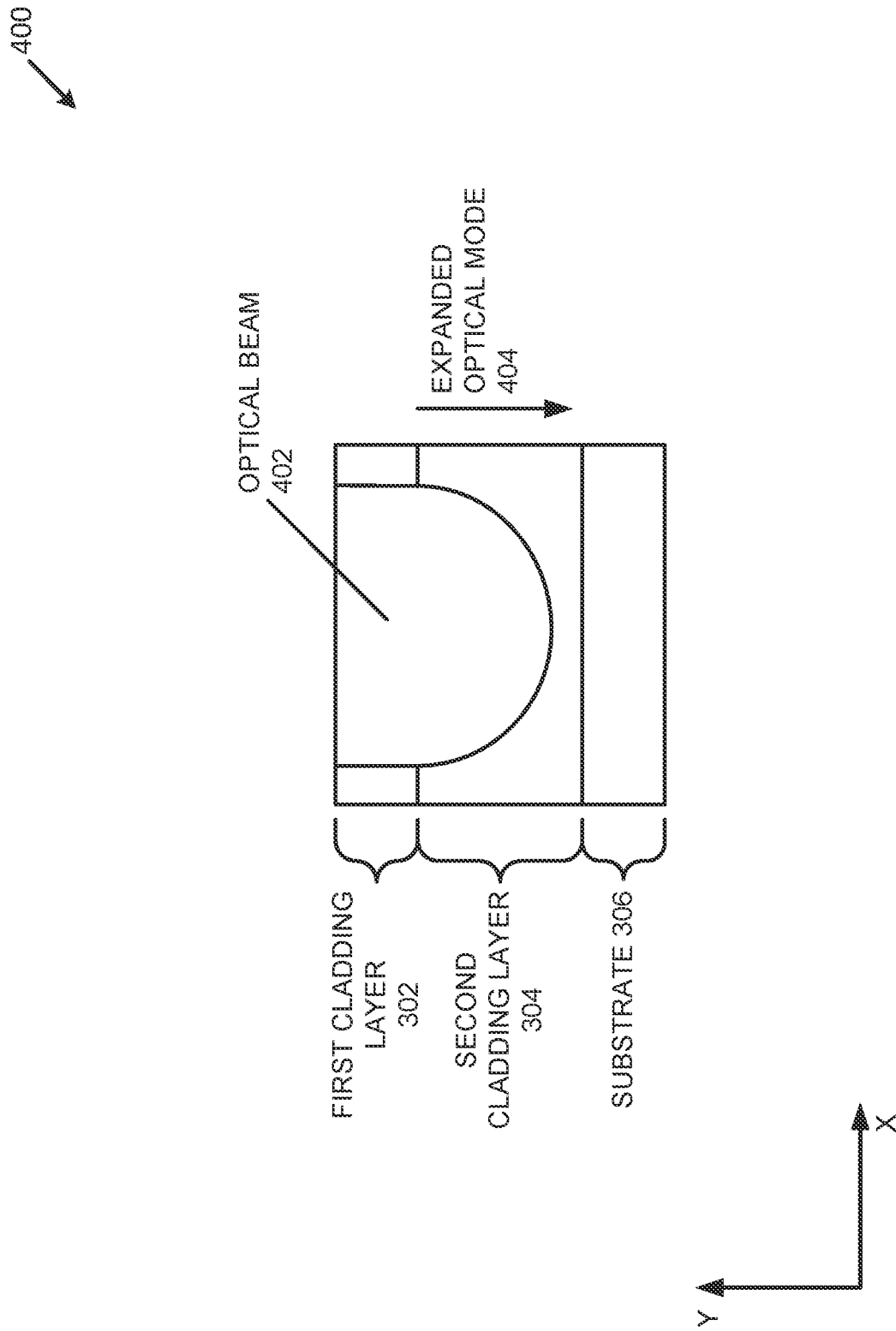
FIG. 4 is an illustration of an example of a cross-section of a waveguide transmitting an optical beam, in accordance with embodiments of the disclosure.

FIG. 4 is an illustration of an example of a waveguide 400 expanding the optical mode of an optical beam, in accordance with embodiments of the disclosure. Waveguide 400 may correspond to waveguide 300, as previously described in FIG. 3, which is transmitting an optical beam 402. In FIG. 4, waveguide may 400 be illustrated in an X-Y plane and the optical beam 402 may be transmitted through waveguide 400 along a Z-axis (not shown) that is perpendicular to the X-Y plane.

Referring to FIG. 4, the range of refractive indexes of the second cladding layer 304 being greater than the refractive index of the first cladding layer 302 pulls the optical beam 402 towards the substrate 306, resulting in an expanded optical mode 404 of the optical beam 402. In some embodiments, the expanded optical mode 404 of the optical beam 402 may reduce the effect of the refractive index difference introduced by a RWG. Therefore, a wider RWG (e.g., RWG width 316) may be required to have a single guided spatial mode. Having a wider RWG may provide for increased saturation power, reduced thermal and electrical impedances, reduced current spreading, and reduced far-field divergence angle, which can improve the performance of the waveguide and associated LIDAR systems described herein.

Furthermore, the expanded optical mode 404 of the optical beam 402 may reduce the optical internal losses as the optical beam 402 is transmitted via the waveguide 400, which results in more efficient optical signals, higher wall plug efficiency (WPE), and reduces amplitude and phase noises typically experienced. In some embodiments, because the optical mode of the optical beam 402 has a relatively small overlap with the first cladding layer 302 dopants may be added to the first cladding layer 302 to further reduce electrical and thermal impedances, improving the efficiency of the waveguide 400 and associated LiDAR systems described herein.

Figure 5:
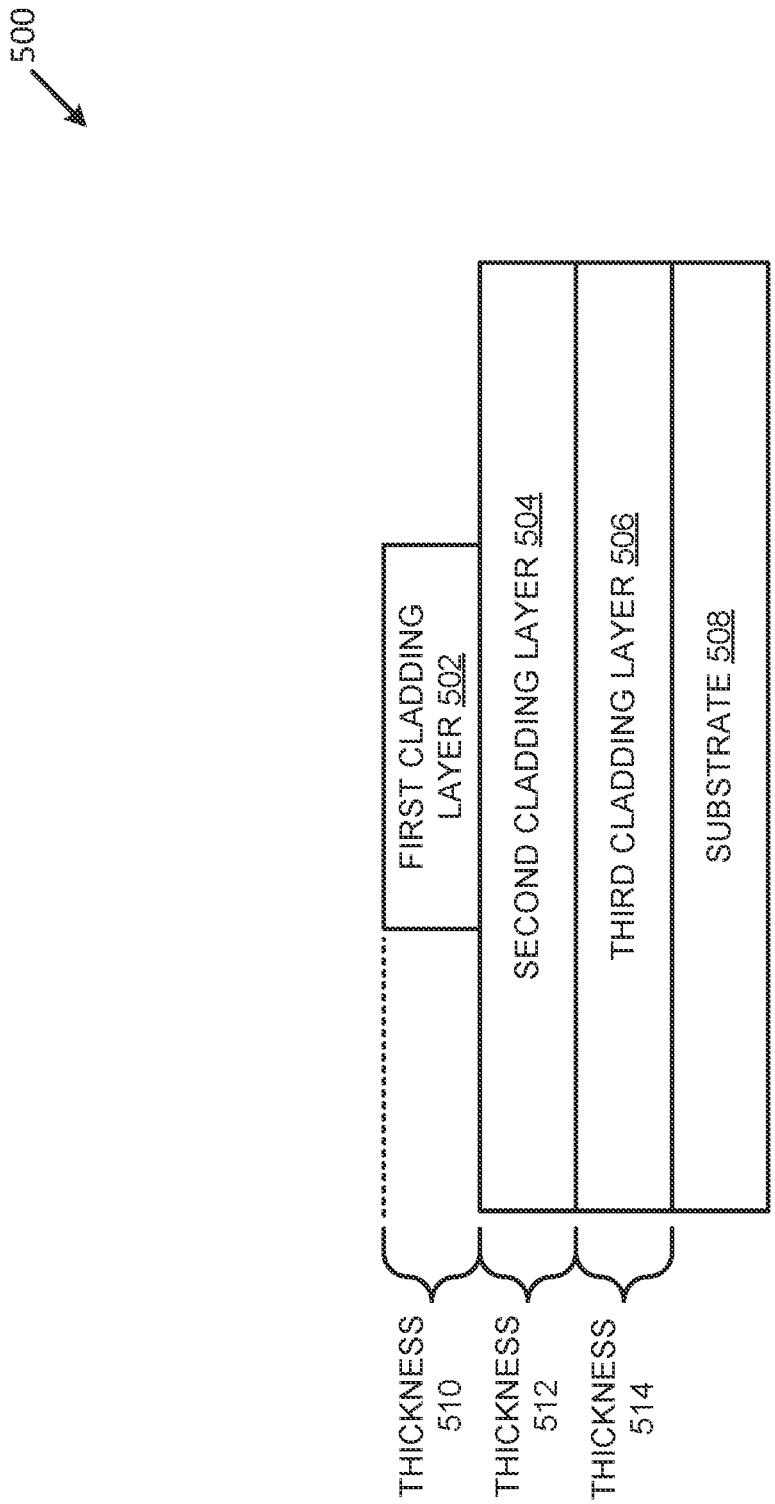
FIG. 5 is an illustration of an example of a waveguide having multiple cladding layers with different refractive indexes, in accordance with embodiments of the disclosure.

FIG. 5 is an illustration of an example of a waveguide 500 having multiple cladding layers with different refractive indexes, in accordance with embodiments of the disclosure. In embodiments, waveguide 500 may be implemented in a LIDAR system, such as the LIDAR system 100 of FIG. 1. The waveguide 500 may include a first cladding layer 502, a second cladding layer 504, and a third cladding layer 506. In FIG. 5, the waveguide 500 is illustrated as being grown on a substrate 508, as previously described at FIG. 3.

In embodiments, the first cladding layer 502 may be formed of a material that has a first refractive index. Example materials that may be used to form the first cladding layer 502 may include, but are not limited to indium phosphide (InP) or indium gallium arsenide phosphide (InGaAsP).

The second cladding layer 504 may be disposed below the first cladding layer 502 and may be formed of a material that has a second refractive index. In embodiments, the second refractive index of the second cladding layer 504 may be greater than the first refractive index of the first cladding layer 502. Example materials that may be used to form the second cladding layer 504 may include, but are not limited to indium phosphide (InP), indium gallium arsenide phosphide (InGaAsP), indium gallium aluminum arsenide (InGaAlAs), or any combination thereof.

The third cladding layer 506 may be disposed below the second cladding layer 504 and may be formed of a material that has a third refractive index. In embodiments, third refractive index of the third cladding layer 506 may be greater than the second refractive index of the second cladding layer 504 and the first refractive index of the first cladding layer 502. Example materials that may be used to form the third cladding layer 506 may include, but are not limited to, indium phosphide (InP), indium gallium arsenide phosphide (InGaAsP), indium gallium aluminum arsenide (InGaAlAs), or any combination thereof.

The third refractive index of the third cladding layer 506 being greater than the second refractive index of the second cladding layer 504 and the first refractive index of the first cladding layer 502 may cause the optical mode of an optical beam being transmitted by waveguide 300 to be expanded (e.g., pulled) towards the substrate 508, as previously described at FIG. 4. In some embodiments, the second cladding layer 504 and/or the third cladding layer 506 may be formed of a material that includes a range of refractive indexes, as previously described at FIG. 3.

In some embodiments, the second cladding layer 504 may be in direct contact with the first cladding layer 502 and/or the third cladding layer 506. In other embodiments, one or more intervening layers may be disposed between the second cladding layer 504 and the first cladding layer 502 and/or the second cladding layer 504 and the third cladding layer 506.

The first cladding layer 502 may have a thickness 510, the second cladding layer 504 may have a thickness 512, and the third cladding layer 506 may have a thickness 514 that each correspond to the dimensional height of their respective cladding layers that form waveguide 500. In some embodiments, the thickness 510 of the first cladding layer 502 may be less than a combination of the thickness 512 of the second cladding layer 504 and the thickness 514 of the third cladding layer 506. In an embodiment, the thickness 514 of the third cladding layer 506 may be less than the thickness 512 of the second cladding layer 504. In some embodiments, the thickness 514 of the third cladding layer 506 may be greater than the thickness 512 of the second cladding layer 504. In other embodiments, the thickness 514 of the third cladding layer 506 may be less than the thickness 512 of the second cladding layer 504. In embodiments, the thickness 514 of the third cladding layer 506 may be between 1 μm and 4 μm. In some embodiments, the thickness 512 of the second cladding layer may be between 1 μm and 2 μm.

It should be noted that thickness 510 of the first cladding layer 502, thickness 512 of the second cladding layer 504, and thickness 514 of the third cladding layer 506 are shown for illustrative purposes only and may not be to scale in accordance with embodiments of the disclosure. Furthermore, although waveguide 500 is illustrated as having three cladding layers, embodiments of the disclosure may include waveguides having any number of cladding layers, any number of refractive indexes, or any combination thereof.

Figure 6:
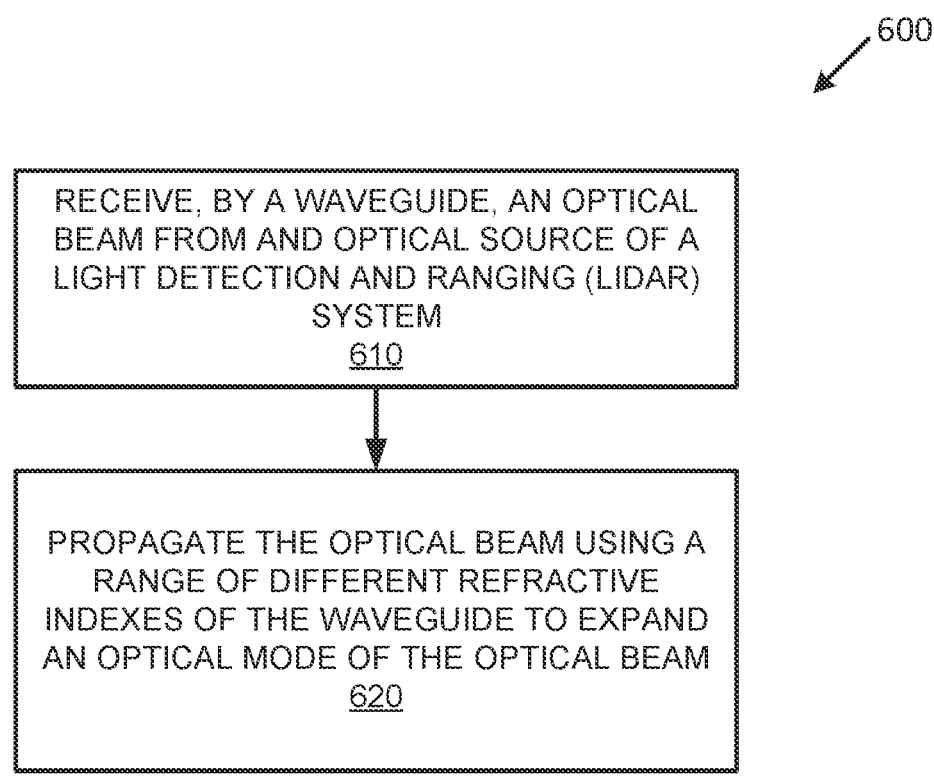
FIG. 6 depicts a flow diagram of a method for utilizing a graded index waveguide by a LIDAR system in accordance with implementations of the present disclosure.

FIG. 6 depicts a flow diagram of a method 600 for utilizing a graded index waveguide by a LIDAR system in accordance with implementations of the present disclosure. In embodiments, various portions of method 600 may be performed by one or more components of LIDAR system 100 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

At block 610, a waveguide receives an optical beam from an optical source of a LIDAR system, as previously described at FIG. 1. The waveguide may include a first cladding layer having a first refractive index and a second cladding layer having second refractive indexes that include a range of different refractive indexes that are greater than the first refractive index. In embodiments, the waveguide may correspond to waveguide 300, as previously described at FIG. 3. In an alternative embodiment, the optical source may provide the optical beam to a waveguide having three or more cladding layers, each having a different refractive index, as previously described at FIG. 5.

At block 620, the waveguide propagates the optical beam using the range of different refractive indexes of the waveguide to expand an optical mode of the optical beam, as previously described.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging apparatus (LIDAR), comprising:
   an optical source to generate an optical beam; and
   one or more waveguides, coupled to the optical source, to steer the optical beam, the one or more waveguides comprising:
   a first cladding layer having a first refractive index; and
   a second cladding layer comprising a single layer disposed below the first cladding layer and above a substrate, the second cladding layer comprising a plurality of second refractive indexes that steer the optical beam towards the substrate, the plurality of second refractive indexes comprising a range of different refractive indexes, wherein the range of different refractive indexes is greater than the first refractive index of the first cladding layer,
   wherein the first cladding layer has a first thickness between 1.2 microns and 1.8 microns, the second cladding layer has a second thickness, and the first thickness is less than the second thickness.

2. The LIDAR apparatus of claim 1, wherein the second cladding layer is comprised of indium phosphide (InP).

3. The LIDAR apparatus of claim 1, wherein the range of refractive indexes increases from a first surface of the second cladding layer and a second surface of the second cladding layer.

4. The LIDAR apparatus of claim 1, wherein the range of different refractive indexes of the second cladding layer expands an optical mode of the optical beam.

5. The LIDAR apparatus of claim 1, further comprising:
a photodetector to receive a combined signal comprising a target signal and a local oscillator signal associated with the optical beam.

6. The LIDAR apparatus of claim 5, wherein the one or more waveguides, the optical source, and the photodetector are positioned on a photonic chip.

7. A method comprising:
receiving, by a waveguide, an optical beam from an optical source of a light detection and ranging (LIDAR) system, the waveguide comprising a first cladding layer having a first refractive index and a second cladding layer comprising a single layer disposed below the first cladding layer, the second cladding layer comprising a plurality of second refractive indexes that steer the optical beam towards a substrate, the plurality of second refractive indexes comprising a range of different refractive indexes, wherein the range of different refractive indexes is greater than the first refractive index of the first cladding layer; and
propagating the optical beam using the range of different refractive indexes of the waveguide to expand an optical mode of the optical beam,
wherein the first cladding layer has a first thickness between 1.2 microns and 1.8 microns, the second cladding layer has a second thickness, and the first thickness is less than the second thickness.

8. The method of claim 7, wherein the range of different refractive indexes increases from a first surface of the second cladding layer and a second surface of the second cladding layer.

9. The method of claim 7, wherein the second cladding layer is comprised of indium phosphide (InP).

10. The method of claim 7, further comprising:
splitting a portion of the optical beam to generate a local oscillator signal;
receiving a target signal associated with the optical beam;
combining the target signal with the local oscillator signal to generate a combined signal; and
providing the combined signal to a photodetector.

11. A light detection and ranging apparatus (LIDAR), comprising:
an optical source to generate an optical beam; and
one or more waveguides, coupled to the optical source, to steer the optical beam, the one or more waveguides comprising:
a first cladding layer having a first refractive index; and
a second cladding layer comprising a single layer disposed below the first cladding layer and above a substrate, the second cladding layer comprising a plurality of second refractive indexes that steer the optical beam towards the substrate, the plurality of second refractive indexes comprising a range of different refractive indexes, wherein the range of different refractive indexes is greater than the first refractive index of the first cladding layer,
wherein the first cladding layer has a first thickness, the second cladding layer has a second thickness between 2 microns and 5 microns, and the first thickness is less than the second thickness.

12. A light detection and ranging apparatus (LIDAR), comprising:
an optical source to generate an optical beam; and
one or more waveguides, coupled to the optical source, to steer the optical beam, the one or more waveguides comprising:
a first cladding layer having a first refractive index; and
a second cladding layer comprising a single layer disposed below the first cladding layer and above a substrate, the second cladding layer comprising a plurality of second refractive indexes that steer the optical beam towards the substrate, the plurality of second refractive indexes comprising a range of different refractive indexes, wherein the range of different refractive indexes is greater than the first refractive index of the first cladding layer,
wherein the second cladding layer is comprised of indium gallium arsenide phosphide (InGaAsP).

13. A light detection and ranging apparatus (LIDAR), comprising:
an optical source to generate an optical beam; and
one or more waveguides, coupled to the optical source, to steer the optical beam, the one or more waveguides comprising:
a first cladding layer having a first refractive index; and
a second cladding layer comprising a single layer disposed below the first cladding layer and above a substrate, the second cladding layer comprising a plurality of second refractive indexes that steer the optical beam towards the substrate, the plurality of second refractive indexes comprising a range of different refractive indexes, wherein the range of different refractive indexes is greater than the first refractive index of the first cladding layer,
wherein the second cladding layer is comprised of indium gallium aluminum arsenide (InGaAlAs).

14. A method comprising:
receiving, by a waveguide, an optical beam from an optical source of a light detection and ranging (LIDAR) system, the waveguide comprising a first cladding layer having a first refractive index and a second cladding layer comprising a single layer disposed below the first cladding layer, the second cladding layer comprising a plurality of second refractive indexes that steer the optical beam towards a substrate, the plurality of second refractive indexes comprising a range of different refractive indexes, wherein the range of different refractive indexes is greater than the first refractive index of the first cladding layer; and
propagating the optical beam using the range of different refractive indexes of the waveguide to expand an optical mode of the optical beam,
wherein the first cladding layer has a first thickness, the second cladding layer has a second thickness between 2 microns and 5 microns, and the first thickness is less than the second thickness.

15. A method comprising:
receiving, by a waveguide, an optical beam from an optical source of a light detection and ranging (LIDAR) system, the waveguide comprising a first cladding layer having a first refractive index and a second cladding layer comprising a single layer disposed below the first cladding layer, the second cladding layer comprising a plurality of second refractive indexes that steer the optical beam towards a substrate, the plurality of second refractive indexes comprising a range of different refractive indexes, wherein the range of different refractive indexes is greater than the first refractive index of the first cladding layer; and propagating the optical beam using the range of different refractive indexes of the waveguide to expand an optical mode of the optical beam, wherein the second cladding layer is comprised of indium gallium arsenide phosphide (InGaAsP).

16. A method comprising:

receiving, by a waveguide, an optical beam from an optical source of a light detection and ranging (LIDAR) system, the waveguide comprising a first cladding layer having a first refractive index and a second cladding layer comprising a single layer disposed below the first cladding layer, the second cladding layer comprising a plurality of second refractive indexes that steer the optical beam towards a substrate, the plurality of second refractive indexes comprising a range of different refractive indexes, wherein the range of different refractive indexes is greater than the first refractive index of the first cladding layer; and propagating the optical beam using the range of different refractive indexes of the waveguide to expand an optical mode of the optical beam, wherein the second cladding layer is comprised of indium gallium aluminum arsenide (InGaAlAs).

* * * * *